United States Patent
Orglmeister

(10) Patent No.: US 10,694,107 B2
(45) Date of Patent: Jun. 23, 2020

(54) METHOD AND DEVICE FOR ELIMINATING THERMAL INTERFERENCE FOR INFRARED AND VIDEO-BASED EARLY FIRE DETECTION

(71) Applicant: Albert Orglmeister, Wiesbaden (DE)

(72) Inventor: Albert Orglmeister, Wiesbaden (DE)

( * ) Notice: Subject to any disclaimer, the term of this patent is extended or adjusted under 35 U.S.C. 154(b) by 0 days.

(21) Appl. No.: 15/807,599

(22) Filed: Nov. 9, 2017

(65) Prior Publication Data

US 2018/0077352 A1 Mar. 15, 2018

Related U.S. Application Data

(63) Continuation-in-part of application No. 15/333,254, filed on Oct. 25, 2016, now abandoned.

(30) Foreign Application Priority Data

Nov. 13, 2015 (DE) .................. 10 2015 119 594

(51) Int. Cl.
| | |
|---|---|
| *A62C 37/11* | (2006.01) |
| *H04N 5/232* | (2006.01) |
| *H04N 5/33* | (2006.01) |
| *G06K 9/00* | (2006.01) |
| *A62C 37/36* | (2006.01) |
| *G08B 17/12* | (2006.01) |
| *G06K 9/20* | (2006.01) |
| *G10L 25/51* | (2013.01) |

(Continued)

(52) U.S. Cl.
CPC ......... *H04N 5/23254* (2013.01); *A62C 37/04* (2013.01); *F23G 5/50* (2013.01); *F23N 5/16* (2013.01); *F23N 5/242* (2013.01); *G06K 9/00771* (2013.01); *G06K 9/209* (2013.01); *G08B 17/12* (2013.01); *G08B 17/125* (2013.01); *G08B 29/188* (2013.01); *G10L 25/51* (2013.01); *H04N 5/23258* (2013.01); *H04N 5/33* (2013.01); *A62C 3/002* (2013.01); *F23G 2208/10* (2013.01); *F23M 2900/11021* (2013.01); *F23N 2229/20* (2020.01); *H04R 3/00* (2013.01); *H04R 3/005* (2013.01); *H04R 2410/00* (2013.01)

(58) Field of Classification Search
CPC ......... A62C 37/04; A62C 3/002; A62C 37/11; A62C 37/48
USPC .............................. 381/56–57, 77–81, 82, 58
See application file for complete search history.

(56) References Cited

U.S. PATENT DOCUMENTS

| | | | |
|---|---|---|---|
| 7,221,260 B2 * | 5/2007 | Berezowski ........... | G08B 17/00 340/286.05 |
| 9,852,620 B1 * | 12/2017 | Hoeft ..................... | G08C 23/02 |

(Continued)

OTHER PUBLICATIONS

Office Action for the U.S. Appl. No. 15/333,254.

*Primary Examiner* — Disler Paul
(74) *Attorney, Agent, or Firm* — Michael Soderman

(57) ABSTRACT

A process for the elimination of thermal interferences in the infrared and video fire detection at an early stage in waste incineration plants, recycling facilities, warehouses and the like. The process is characterized by an additional noise and vibration analysis, by measuring the noise level of vehicles situated in the area to be detected or other thermal interference sources, with a distinction in measuring the noise level between day mode and night mode. The volume thresholds can thus be determined and be used as a threshold for determining whether a fire extinguishing sequence should be triggered.

11 Claims, 3 Drawing Sheets

(51) Int. Cl.
*F23N 5/16* (2006.01)
*F23N 5/24* (2006.01)
*F23G 5/50* (2006.01)
*G08B 29/18* (2006.01)
A62C 3/00 (2006.01)
H04R 3/00 (2006.01)

(56) References Cited

U.S. PATENT DOCUMENTS

| | | | |
|---|---|---|---|
| 9,986,313 B2 * | 5/2018 | Schwarzkopf | H04Q 9/00 |
| 2004/0081322 A1 * | 4/2004 | Schliep | G08G 1/015 |
| | | | 381/57 |
| 2005/0105743 A1 * | 5/2005 | Faltesek | G08B 17/00 |
| | | | 381/82 |
| 2007/0183604 A1 * | 8/2007 | Araki | G10L 17/26 |
| | | | 381/58 |
| 2010/0086139 A1 * | 4/2010 | Nicolino, Jr. | G10K 15/02 |
| | | | 381/56 |
| 2015/0070166 A1 * | 3/2015 | Boyden | G08B 25/08 |
| | | | 340/540 |
| 2015/0287310 A1 * | 10/2015 | Deliuliis | H04W 4/90 |
| | | | 340/628 |
| 2016/0011663 A1 * | 1/2016 | Starner | G06F 1/163 |
| | | | 340/407.2 |
| 2016/0316293 A1 * | 10/2016 | Klimanis | H04L 12/2823 |
| 2016/0381475 A1 * | 12/2016 | Starobin | H04R 27/00 |
| | | | 381/81 |

* cited by examiner

METHOD AND DEVICE FOR ELIMINATING THERMAL INTERFERENCE FOR INFRARED AND VIDEO-BASED EARLY FIRE DETECTION

CROSS REFERENCE TO RELATED APPLICATIONS

This application is a continuation-in-part of U.S. Ser. No. 15/333,254 filed on Oct. 25, 2016, and claims the priority of DE 102015119594.1 filed on 2015 Nov. 13; all documents are incorporated by reference herein in their entirety.

BACKGROUND

The invention refers to a process for eliminating thermal interference for infrared and video-based early fire detection in waste incineration plants, recycling facilities, warehouses and the like, via a detection system that detects heat sources being coupled to a processing unit.

A process for processing noise signals of a noise source, e.g. of a traveling vehicle, of a workshop, is known from US 2004/0081322 A1. By performing a sound analysis of the signal features of detected noise signals and, as a result of this, using the determination of parameters of the noise source causing the noise signals, it is possible to document the temporal and/or spatial behaviors of the noise source. Thermal radiation is not addressed here.

Different sensor systems are known that can detect a fire. Furthermore, there are various extinguishing systems, i.e. fire extinguishing systems, with which fires are extinguished in industrial plants or larger rooms. Typically, a fire is detected and a fire extinguishing system is switched on, thereby spraying a large amount of extinguishing agent such as water or foam, in the fire area, flooding and thus extinguishes the fire. Of greatest importance is the detection of a fire. This takes place in particular by means of thermal differential detectors, smoke fire detectors, aspirating smoke detectors, flame detectors, infrared detectors and infrared cameras.

In particular sprinkler systems, which are significantly more powerful deluge facilities and manually controlled fire monitors can be used as extinguishing systems. The latter are referred to as cannons or as a water throwers.

Increasingly, more and more infrared detectors, in particular infrared cameras and video cameras, have been used for early fire detection in waste incineration plants, recycling plants, warehouses and the like.

Fire detection with fire detection systems based on infrared cameras is triggered when a limit temperature has been exceeded.

With video-based systems, fire detection is triggered by smoke detection, flame detection or by evaluating the short-wave infrared portion.

For example, in a warehouse, loaded with recycled materials, a temperature threshold of 80° C. as a fire alarm temperature is often defined as fire triggering temperature. The temperature is the one selected to be high so as not to detect self-heating by fermentation processes in the recycled material as a fire trigger. On the other hand, the alarm temperature is selected to be as low as possible in order to detect fires as soon as possible, which are located inside a material heap, or its rising convection heat that penetrates the surface of the material pile.

This method has proven itself and functions smoothly as long as there are no thermal interferences. These are generated for example by a hot exhaust or hot engine of a wheel loader. In operation, peak temperatures up to 500° C. can be achieved here quickly.

Currently, it has been attempted to eliminate these thermal interferences by using temperature and magnitude ratios. For example, the surface of an exhaust pipe of a wheel loader with a temperature limit of 80° C. quickly reaches a limit temperature exceeding area of 1 m$^2$. This means that currently at least an area of 1 m$^2$ must be detected above 80° C., to trigger a fire alarm. In everyday use, this area can even be increased. Consequently, the surface of the hot engine and the heated body parts near the engine is thus added to the exhaust area. It is also possible that juxtaposed wheel loaders and other vehicles combine to increase the size of disruptive areas. Since the distances between the infrared detection system and the vehicles vary, a tolerance must be factored in when determining the size of the limit temperature exceeding area. Ultimately, as soon the limit temperature exceeding area rises to 3 m$^2$.

The advantage of early detection by infrared and video analysis is considerably weakened because such a large contiguous area that exceeds 80° C. in an aggregate material, requires a huge fire in said aggregate material. Also, a second higher limit temperature, for example at 200° C., does not change the result significantly. The smaller detection surface works in combination with a higher limit temperature, but again has the disadvantage that a concealed fire already has a significant size in an aggregate material.

Analysis now relate to the color, shape and markings to be able to identify the interferences clearly and include the considerable soil load of the objects and the fact that hot interfering objects such as an exhaust of vehicles, which are driven from the rain in a hall, behave exactly at a thermal image analysis as an initial fire whose temperature limit exceeding borders expand.

Furthermore, a distinction is made between the so-called "Day mode", when vehicles may run within the area to be monitored for fire, and "Night mode", when vehicles and other thermal interference sources such as thermal drive motors of machinery are not authorized.

SUMMARY

The invention relates to a process for the elimination of thermal interferences in the infrared and video fire detection at an early stage in waste incineration plants, recycling facilities, warehouses and the like. The process is characterized by an additional noise and vibration analysis, by measuring the noise level of vehicles situated in the area to be detected or other thermal interference sources, with a distinction in measuring the noise level between day mode and night mode. The volume thresholds can thus be determined and be used as a threshold for determining whether a fire extinguishing sequence should be triggered.

DETAILED DESCRIPTION

The object of the invention is to provide a method for eliminating thermal problems in the infrared and video fire detection at an early stage in waste incineration plants, recycling facilities, warehouses and the like, allowing safe fire detection at an early stage with the elimination of so many thermal interferences as possible.

According to the invention, the object is achieved by an additional noise and vibration analysis by measuring the noises or vibrations via measuring equipment, the measuring equipment being connected to the processing unit, the processing unit including a memory device for storing noise and vibration data and distinguishing between permissible heat sources and impermissible heat sources via an analysis device.

Thus, the currently known methods of analysis, namely infrared and/or video fire detection at an early stage, are combined with sound or vibration detection in order to discriminate whether vehicles or other thermal interference sources, such as in particular drive motors of machinery, are situated in the area to be detected, in incinerators, recycling facilities, warehouses and the like.

When an impermissible heat source is detected, the processing unit is used to activate a fire extinguishing system in order to extinguish a fire or cool off the impermissible heat source. Alternatively or additionally, an alert, for example in the form of a visually and/or audibly perceptible signal, in particular for supervisory personnel, can be triggered, a siren, for example, can be activated in the processing unit and/or a beacon lamp and/or a warning can be displayed on a display device and/or a central fire alarm system can be activated.

According to another embodiment of the method of the invention, the noise and vibration analysis can be permanent and/or time-controlled.

Furthermore, the volume levels are determined for the non-working operation, such as night mode, and the operating mode, for example, during daytime. The volume thresholds determined with the noise and vibration analysis are then used as a threshold for determining whether a fire extinguishing sequence is triggered. Alternatively or additionally, a fire alarm can be activated.

According to another embodiment of the solution of the inventive, analog and/or digital filters, directional microphones, external microphones for a 3-dimensional noise pattern, brand specific noise filters and/or vibration sensors are used for noise and vibration analysis.

Using analog and/or digital filters in the noise analysis thus enables to establish which vehicle or which type of vehicle, including wheel loaders, trucks or the like, is the area to be detected or whether it is a specific operating area of facilities to be monitored. Here also interference noises external to the facilities can be filtered out.

Alternatively, when a directional microphone is used, in parallel with the infrared or video analysis, the interference can be associated locally with the object currently detected. It is also possible to use several directional microphones.

Using external microphones and a 3-dimensional noise pattern may provide clues about appliances in operation and integrate these into the analysis.

The noise analysis can also be used to detect a fire, whereby brand specific noise filters are used for analysis. Consequently, combination with the infrared and/or video analysis provides for an even better decision whether we are dealing with a fire or an interference.

Finally, instead of conventional microphones, vibration sensors, in particular low-frequency microphones, can be used to analyze noises in the low frequency range or sub-frequency range.

It goes with saying that the features aforementioned and those still to be explained below cannot solely be applied in the given combination, but also in other combinations or individually, without departing from the framework of the present invention.

BRIEF DESCRIPTION OF THE DRAWINGS

The drawings show schematic diagrams of the interference detection via noise analysis for the detection of fires.

DETAILED DESCRIPTION OF THE PREFERRED EMBODIMENTS

Figure 1:
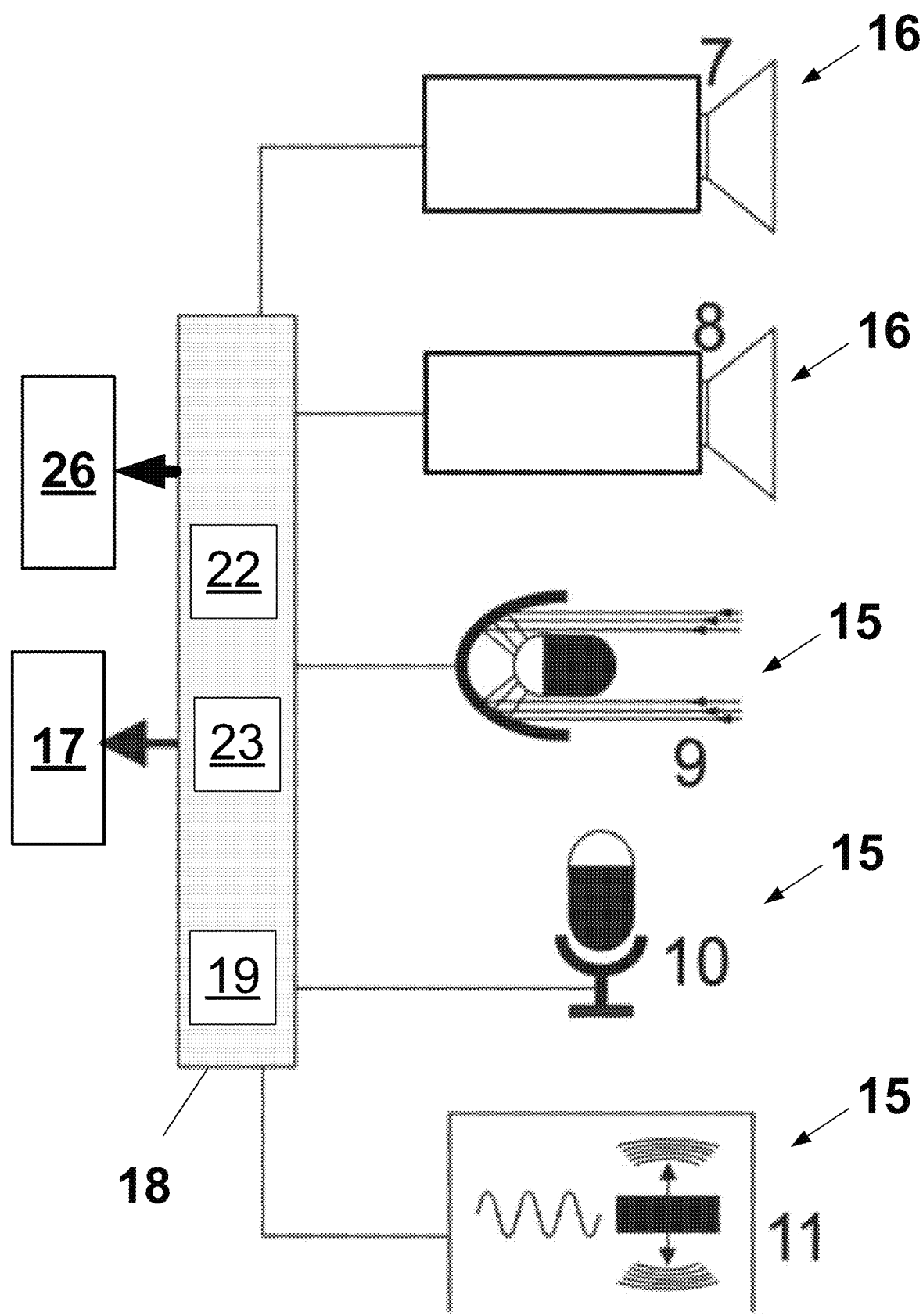
FIG. 1 shows sensors, analysis and the signal output.
Figure 2:
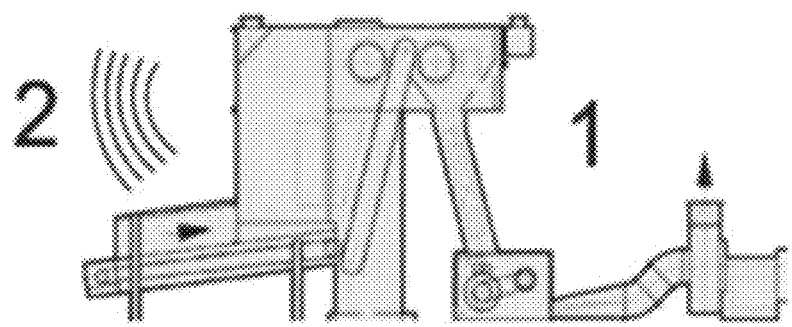
FIG. 2 shows a processing facility and operating noise in the processing facility.
Figure 3:
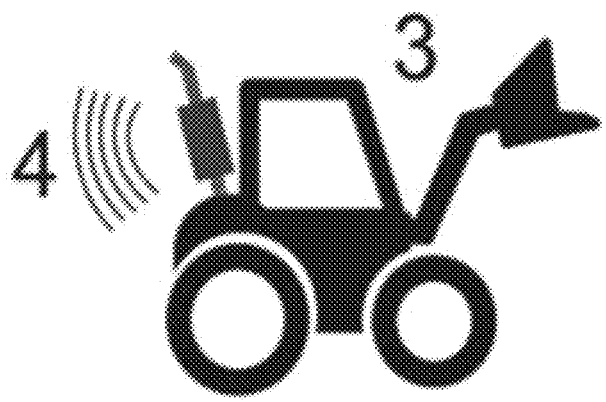
FIG. 3 shows interference via operating noise of a vehicle.
Figure 4:
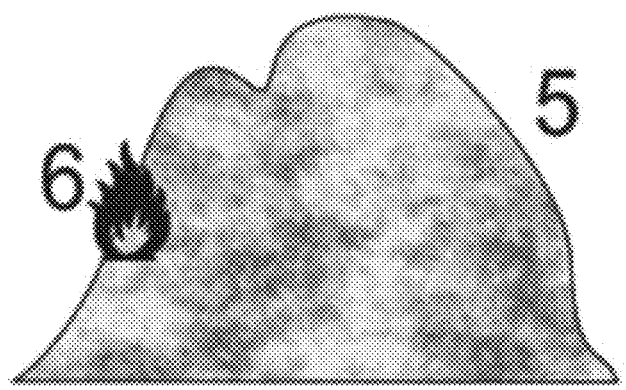
FIG. 4 shows material that is being monitored for a fire and a possible hotspot.
Figure 5:
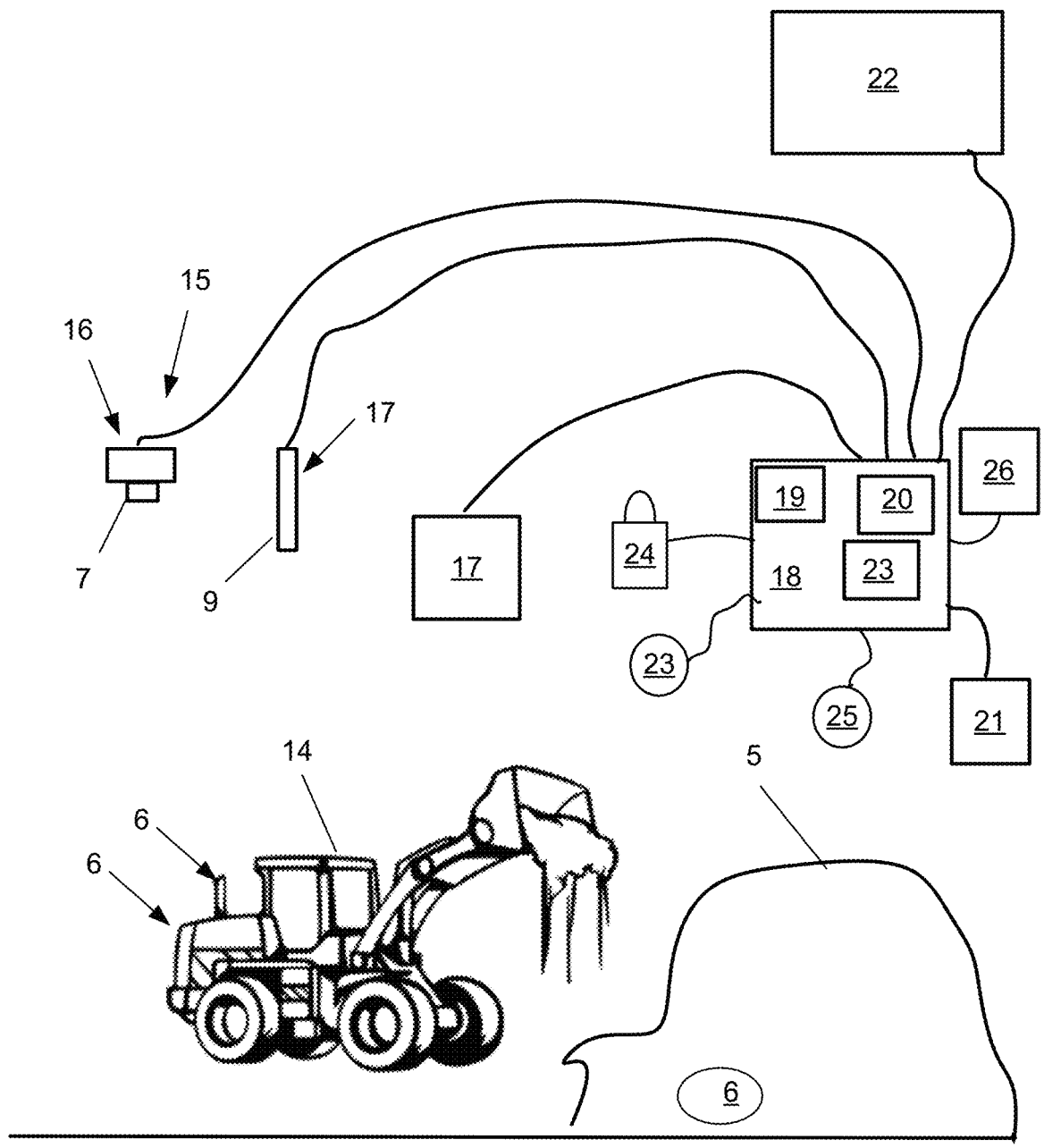
FIG. 5 shows a schematic illustration of a processing facility with a device according to the invention.

The method is used in a processing facility 1, for example for the treatment of recycling material, or in a waste incineration plant or a warehouse for inflammable objects, for example a warehouse for rubber tires or wood or the like. In processing facility 1, material 5, for example the recycling material or the waste or stored goods, is usually transported with a wheel loader 14. Such a wheel loader 14 comprises at least one heat-generating combustion engine and an exhaust pipe that is hot during operation, these heat-radiating components being perceptible as interference 3. Furthermore, wheel loader 14, which is mentioned as an example of any motor vehicle, generates operating noises 4 during operation that can be detected in addition to other operating noises 2 in processing facility 1 via detecting equipment 15. The other operating noises 2 can be those made by doors and gates, transporting devices, such as cranes, and the like.

The measuring equipment 15 for operating noises 2, 4 and/or vibrations that also come from wheel loader 14 or other operating means in processing facility 1 are, in particular, at least one directional microphone 9 and/or an external microphone 10 and/or a vibration sensor 11.

Furthermore, a heat-detecting detection system 16 is installed in processing facility 1 that comprises an IR camera 7, which is also referred to as a thermal imaging camera, and/or a video camera 8.

For the purpose of extinguishing a fire, a fire extinguishing system 17 with an extinguishing cannon is installed. The extinguishing cannon is, for example, connected to a water supply and/or an extinguishing agent supply. Furthermore, fire extinguishing system 17 comprises, in particular, servomotors for aligning the extinguishing cannon and pumps for conveying water and/or extinguishing agents.

The measuring equipment 15 for operating noises 2, 4 and vibrations are coupled by means of corresponding interfaces to a processing unit 18, to which fire extinguishing system 17 is also connected for the purpose of activation. Furthermore, the processing unit comprising at least one computing module (CPU) 19 and at least one memory device 20 is connected to input and output devices, such as a joystick 21 for manually aligning the extinguishing cannon by means of the at least one respective servomotor and a touchscreen 22 for inputting information and showing images from IR camera 7 or video camera 8.

IR camera 7 and/or video camera 8, which can be installed in a camera housing that can also hold directional microphone 9 and/or external microphone 10 and/or vibration sensor 11, are pivoted horizontally and/or vertically by means of at least one motor that is activated by processing unit 18 to permanently cover or scan a monitoring area.

The detection system can also be installed in a fixed measuring system (IR/video), i.e., for example, a camera housing of IR camera 7 or of the video camera that is not pivoted, but oriented to monitor a specific area.

Noise data and/or vibration data and temperature data are stored in memory device 20 of processing unit 18 that can be allocated to the operating means, in particular wheel loaders 14, in processing facility 1. Furthermore, a temperature indicative of a fire is stored in the memory device as a threshold value. The noise data can be volumes and/or frequencies that, like the vibration data, can be unambiguously allocated to one of the operating means.

This noise data and/or vibration data and/or temperature data can, for example, be recorded on site during installation or when the method is introduced in processing facility 1 and be used in memory device 20 as a basis or nominal data for comparing them with or analyzing actual data that is recorded during the ongoing monitoring of processing facility 1. Corresponding nominal data can also be provided by a manufacturer of the operating means as characteristic data and read into memory device 20.

If, for example, a heat source 6 (hotspot) is also detected with a temperature above the stored threshold value of IR camera 7 or video camera 8 using an associated image recognition system in connection with the noise data or vibration data, the presence of a permissible heat source 6, for example the drive motor of wheel loader 14 or its exhaust system, can be concluded and fire extinguishing system 17 is not automatically activated via processing unit 18. Of course, in such a case, a warning that is visually or audibly perceptible by supervisory personnel, for example by means of touchscreen 22 and/or a speaker 23 of processing unit 18, can be issued to prompt the supervisory personnel to check heat source 6.

The evaluation or analysis of the noise data or vibration data can be perceived with relative precision by means of filters implemented in processing unit 18 and an analysis device 23, which can also take the form of software, such that different operating means, in particular wheel loaders 14 and other vehicles, can also be detected.

If IR camera 7 or video camera 8 detects a heat source 6 at a location within processing facility 1 to which no noise data or vibration data can be allocated and to which a temperature above the stored threshold value can be allocated, the presence of a fire, i.e. an impermissible heat source 6, can be concluded and processing unit 18 activates fire extinguishing system 16 to extinguish a fire. For this purpose, an extinguishing cannon of fire extinguishing system 16 can be adjusted by means of a motor controlled by processing unit 18.

In addition to the activation of fire extinguishing system 16 or as an alternative thereto, an alert, for example in the form of a visually and/or audibly perceptible signal, to a fire alarm system 26 and/or for supervisory personnel can be triggered, which is achieved by processing unit 18 activating a siren 25 and/or a beacon lamp 24 and/or a warning on a display device, preferably touchscreen 22.

Of course, a temperature value can also be stored on memory device 20 as a threshold value or limit value, which, when exceeded, indicates the presence of an impermissible event in that case and fire extinguishing system 16 for extinguishing a fire is activated by processing unit 18 or an alert, for example by means of siren 25 and/or beacon lamp 24, is triggered. In the same way, a size of heat source 6, i.e. its area or its dimensions, can be stored as an indication of a permissible or impermissible heat source 6, that is, for example, a drive motor or fire source.

Noise data, i.e., in particular, volumes and/or frequencies that can be measured with directional microphone 9 and evaluated by processing unit 18, that suggest a fire can also be stored on memory device 20.

It is also possible to store different noise data and vibration data and temperature data, i.e. nominal data or threshold values or limit values for so-called "Day mode", during which there is normal working operation in processing facility 1, and for so-called "Night mode", during which there is non-working operation, in particular as a function of calendar data and times of day that are applied to processing unit 18 to bring about automatic switching from "Day mode" to "Night mode" and vice versa. This switch from "Day mode" to "Night mode" and vice versa can also be carried out by supervisory personnel, for example by making an input on touchscreen 22. In "Night mode", it can be seen that there is a pattern of noises and/or vibrations and/or temperatures that deviates from "Day mode" and less thermal interference caused by operating means, in particular by wheel loaders 14, occurs in processing facility 1 during non-working operation than during normal working hours.

LIST OF REFERENCE NUMERALS

1. Processing facility
2. Operating noise
3. Thermal interference
4. Operating noise
5. Material
6. Heat source
7. IR camera
8. Video camera
9. Directional microphone
10. Microphone
11. Vibration sensor
12. Wheel loader
13. Measuring equipment
14. Detection system
15. Fire extinguishing system
16. Processing unit
17. Computing module
18. Memory device
19. Joystick
20. Touchscreen
21. Analysis device
22. Beacon lamp
23. Siren
24. Fire alarm system

The invention claimed is:

1. A method for eliminating thermal interferences in infrared and video fire detection at an early stage in waste incineration plants, recycling facilities and warehouses, via a detection system that detects heat sources, comprising the steps: detecting noise and vibration via measuring equipment, wherein the measuring equipment also measures the noise level and the noises and the vibrations of vehicles and other sources of thermal interference in the area to be detected, said vibrations of vehicles and other sources of thermal interference being filtered out and recognized for differentiation in an analysis, analyzing the noise and the vibration detected via the measuring equipment, the measuring equipment being connected to a processing unit, the processing unit including a memory device for storing noise and vibration data and distinguishing between permissible heat sources and impermissible heat sources by means of an analysis device based on the noise and the vibration data and the infrared and the video data.

2. The method according to claim 1, wherein the processing unit activates a fire extinguishing system in order to extinguish a fire or cool off an impermissible heat source when said impermissible heat source is detected.

3. The method according to claim 1, wherein the processing unit triggers an alert when an impermissible heat source is detected.

4. The method according to claim 1, wherein a distinction is made in measuring the noise level between day mode and night mode.

5. The method according to claim 1, wherein noise and vibration analysis can be permanent and/or time-controlled.

6. The method according to claim 1, wherein the volume levels are determined for non-working operation during night mode, and an operating mode during daytime.

7. The method according to claim 1, wherein analog and/or digital filters, directional microphones, external microphones for a 3-dimensional noise pattern, brand specific noise filters and/or vibration sensors are used for noise and vibration analysis.

8. The method according to claim 1, wherein IR, video and temperature data is additionally measured and analyzed.

9. A device for eliminating thermal interference for infrared and video-based early fire detection in waste incineration plants, recycling facilities, warehouses, via a detection system that detects heat sources, comprising a noise and vibration analysis device integrated into the processing unit to which measuring equipment coupled to the processing unit is allocated for measuring noise and vibrations, wherein the measuring equipment also measures the noise level and the noises and the vibrations of vehicles and other sources of thermal interference in the area to be detected, said vibrations of vehicles and other sources of thermal interference being filtered out and recognized for differentiation in an analysis, the processing unit including a memory device for storing the noise data and the vibration data and distinguishing between permissible heat sources and impermissible heat sources via an analysis device integrated into the processing unit based on the noise and vibration analysis and the infrared and the video data.

10. The device according to claim 9, wherein the processing unit is connected to a fire extinguishing system for extinguishing a fire or cooling off an impermissible heat source.

11. The device according to claim 9, wherein equipment for IR, video and temperature input exists and wherein this input is additionally analyzed.

* * * * *